(12) United States Patent
Hovland et al.

(10) Patent No.: US 11,011,805 B2
(45) Date of Patent: May 18, 2021

(54) ELECTRODE

(71) Applicant: Medtronic, Inc., Minneapolis, MN (US)

(72) Inventors: Erik J. Hovland, Minnetonka, MN (US); Steve Bruesehoff, Annandale, MN (US)

(73) Assignee: Medtronic, Inc., Minneapolis, MN (US)

( * ) Notice: Subject to any disclaimer, the term of this patent is extended or adjusted under 35 U.S.C. 154(b) by 110 days.

(21) Appl. No.: 16/367,450

(22) Filed: Mar. 28, 2019

(65) Prior Publication Data
US 2020/0313143 A1 Oct. 1, 2020

(51) Int. Cl.
| | | |
|---|---|---|
| *H01M 50/531* | (2021.01) | |
| *H01M 10/0525* | (2010.01) | |
| *H01M 50/529* | (2021.01) | |
| *H01M 4/13* | (2010.01) | |
| *H01M 10/0585* | (2010.01) | |
| *H01M 10/052* | (2010.01) | |

(52) U.S. Cl.
CPC ........... *H01M 50/531* (2021.01); *H01M 4/13* (2013.01); *H01M 10/052* (2013.01); *H01M 10/0525* (2013.01); *H01M 10/0585* (2013.01); *H01M 50/529* (2021.01)

(58) Field of Classification Search
CPC ............ H01M 2/24; H01M 2/26; H01M 2/70; H01M 4/70; H01M 4/13; H01M 10/052; H01M 10/0525; H01M 10/0585
See application file for complete search history.

(56) References Cited

U.S. PATENT DOCUMENTS

| | | | |
|---|---|---|---|
| 6,664,005 B2* | 12/2003 | Kezuka ............. | H01M 10/0431 429/233 |
| 2007/0178383 A1 | 8/2007 | Viavattine et al. | |
| 2009/0208816 A1 | 8/2009 | Viavattine et al. | |
| 2014/0170467 A1* | 6/2014 | Kwon .................... | H01M 2/18 429/152 |
| 2015/0136840 A1 | 5/2015 | Zhao et al. | |
| 2015/0243962 A1* | 8/2015 | Hiroki .................. | H01M 4/139 429/233 |
| 2018/0269458 A1* | 9/2018 | Oh ..................... | H01M 10/0583 |
| 2019/0020013 A1* | 1/2019 | Zeng .................. | H01M 2/1077 |

FOREIGN PATENT DOCUMENTS

WO WO-2017104956 A1 * 6/2017 ............. H01M 2/10

* cited by examiner

*Primary Examiner* — Gregg Cantelmo
(74) *Attorney, Agent, or Firm* — Mueting Raasch Group (57) ABSTRACT

Some examples include an electrode for an electrochemical cell including a plate portion and a tab portion. The plate portion includes a plate body, a perimeter body edge, and an inset area recessed into the plate body from the perimeter body edge. The inset area is defined by an inset edge. The tab portion extends from the plate portion. The tab portion includes a tab body and tab body edge. The inset edge extends between the perimeter body edge and the tab body edge.

14 Claims, 5 Drawing Sheets

ELECTRODE

TECHNICAL FIELD

This disclosure generally relates to the field of electrodes employed in batteries, and more particularly, to stacked plate electrodes useful in batteries.

BACKGROUND

Electrochemical cells in the form of batteries are widely used to power electronic devices. Electrochemical cells having small size, high energy density, and reliable power capability are highly desirable. A multitude of stacked plate electrodes can be joined together to form the power cell, or battery. In certain applications, it can be desirable to include rechargeable lithium-ion batteries in devices, such that the batteries do not have to be removed from and replaced within the device. One such application is in medical devices.

SUMMARY

Some aspects, in accordance with principles of the present disclosure, relate to an electrode for an electrochemical cell including a plate portion and a tab portion. The plate portion includes a plate body, a perimeter body edge, and an inset area recessed into the plate body from the perimeter body edge. The inset area is defined by an inset edge. The tab portion extends from the plate portion. The tab portion includes a tab body and tab body edge. The inset edge extends between the perimeter body edge and the tab body edge.

Other aspects, in accordance with principles of the present disclosure, relate to an electrode assembly for a battery including a plurality of electrodes arranged one atop another in a stack. Each of the plurality of electrodes includes a plate portion and a tab portion extending from the plate portion. The tab portions of the plurality of electrodes are aligned. At least a bottom electrode of the plurality of electrodes includes an inset area extending from adjacent a tab connecting end of the tab portion and recessed into a body of the plate portion extending alongside the tab portion.

Other aspects, in accordance with principles of the present disclosure, relate to a rechargeable lithium-ion battery including an electrode assembly, a current connector, and a battery case. The electrode assembly includes a plurality of electrodes assembled in a stack. Each of the plurality of electrodes includes a plate portion and a tab portion extending from the plate portion. The tab portion of the plurality of electrodes are aligned at an end of the stack along an axis defined by a height of the stack. At least a bottom electrode of the plurality of electrodes includes an inset area. The insert area extends from the tab portion and is recessed into a body of the plate portion alongside the tab portion. The inset area forms a bend stress distribution radius along the tab connecting end of the tab portion. The current connector is to electrically connect the tab portions of the plurality of electrodes. The battery case is to house the electrode assembly and the current connector.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Power supplies, or batteries, can include an electrode assembly formed of stacked electrode plates including one or more anode electrodes and one or more cathode electrodes, stacked in an alternating fashion (e.g., anode, cathode, anode, cathode, etc.), with separators made from a porous polymer or other suitable material provided between the anode and cathode electrodes to prevent direct contact between adjacent electrodes. The electrode plates extend as fully as possible within a battery cavity in order to maximize the energy density within the space of the battery. Available space within the battery case is desirably maximized by packing components tightly within the case to maximize the capacity of the power cell. This often leaves minimal space to electrically connect the electrodes together.

When assembled, stacked plate electrodes forming electrochemical cells, are joined together at a common location to form an electrical contact point. In order to be joined together, tabs of the electrodes may be bent relative to the plates which can cause mechanical stress along and/or adjacent to the bend location. In some cases, the mechanical stress can cause damage to the electrode by tearing, partially or fully disconnecting or detaching the tab from the electrode plate. Partially or fully disconnected tabs can undesirably reduce the capacity of the battery. Maintaining the integrity of the electrodes by minimizing or eliminating damage to the electrodes resulting from the joinder of the tabs is desirable. Aspects of the present disclosure can provide a reduction of mechanical stress to the electrode at or along the tab bend location, or area, and maintain the maximum electrical capacity of the electrode assembly.

Figure 1:
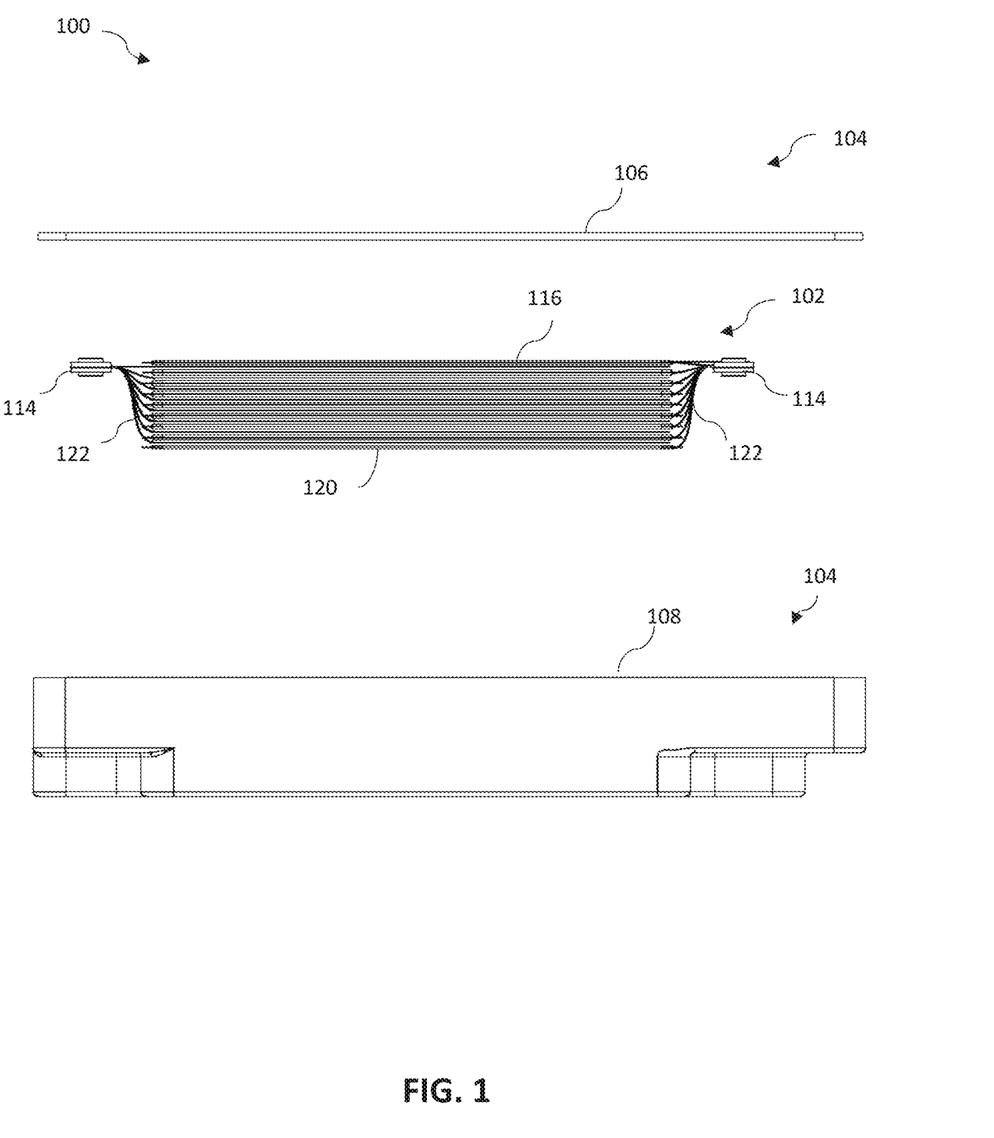
FIG. 1 is an exploded view of an example battery in accordance with aspects of the present disclosure.

FIG. 1 is an exploded view of an example battery 100 in accordance with aspects of the present disclosure. In one example, the battery 100 can be a lithium-ion battery. In one example, the battery 100 can be a rechargeable lithium-ion battery. The battery 100 includes an electrode assembly 102 and a battery case 104 to house the electrode assembly 102, as described further below.

The battery 100 of FIG. 1 will be described further with additional reference to the cross-sectional view of the example assembled battery 100 illustrated in FIG. 2. In one example, the battery case 104 of the battery 100 includes a cover 106 and a housing 108. The cover 106 and the housing 108 of the battery case 104 form an enclosure suitable to contain the electrode assembly 102. The cover 106 can extend over the open side of the housing 108 to enclose an interior cavity 110 of the battery case 104. The cover 106 and the housing 108 can be formed separately and assembled and sealed (e.g., hermitically sealed) together after the electrode assembly 102 and any other desired components are assembled within the battery case 104. The cover 106 can be welded or otherwise sealed to the housing 108.

The cover 106 and the housing 108 of the battery case 104 can be made of a biologically compatible material such as medical grade titanium, aluminum, or stainless steel, for example. The battery case 104 material is compatible with the chemistry of the cell electrolyte and other materials housed within the battery case 104 in order to prevent corrosion. The battery case 104 can be manufactured from a variety of process including, for example, machining, casting, stamping, milling, three-dimensional (3D) printing, thermoforming, injection molding, vacuum molding, or other suitable process. In one example, the battery case 104 can be a shallow drawn hermetic battery case enclosure and the electrode assembly 102 can be housed and hermetically sealed within. The term "shallow drawn", in accordance with this disclosure, means having a height less than a width and/or length.

The battery case 104 can include an insulative liner (not shown) correspondingly sized and shaped such that the liner can be fitted within the interior cavity 110 defined by an interior surface of the battery case 104. The battery 100 can include a feed-through terminal 112, liquid electrolyte (not shown), and the electrode assembly 102 housed within the battery case 104. Electrolyte creates an ionic path between anode and cathode of the electrode assembly 102. Electrolyte serves as a medium for migration of ions between anode and cathode during an electrochemical reaction of the electrode assembly 102. The feed through terminal 112 extends from a conductive coupler 114 electrically connected to each of the electrode assembly 102 to the exterior of the battery case 104 to transfer electrical energy from the electrode assembly 102 to the device being powered by the battery 100, for example, an implantable medical device (not shown).

The electrode assembly 102 includes a plurality of electrodes 116. The electrodes 116 of a suitable quantity are assembled to a maximized stack height of the electrode assembly 102 that can be suitably contained within the battery case 104 and provide a maximum energy density of the battery 100. In one example, the electrode assembly 102 can have dimensions slightly smaller than the interior cavity 110 of the battery case 104. The electrodes 116 can be manufactured to be any suitable shape and contour to be assembled and contained within the battery case 104. For example, the electrodes 116 can be laser cut or otherwise formed to match, or coincide, with the shape and form of the interior cavity 110 of the battery case 104. The electrode assembly 102 can include any number, or quantity, or electrodes 116 as suitable to accommodate the electrical capacity and space desired of the battery 100. The electrode assembly 102 is formed to maximize the energy output provided within the battery case 104. In other words, the electrode assembly 102 is formed to fill the space as much as allowable in all three spatial dimensions (e.g., x, y, z axes).

Figure 2:
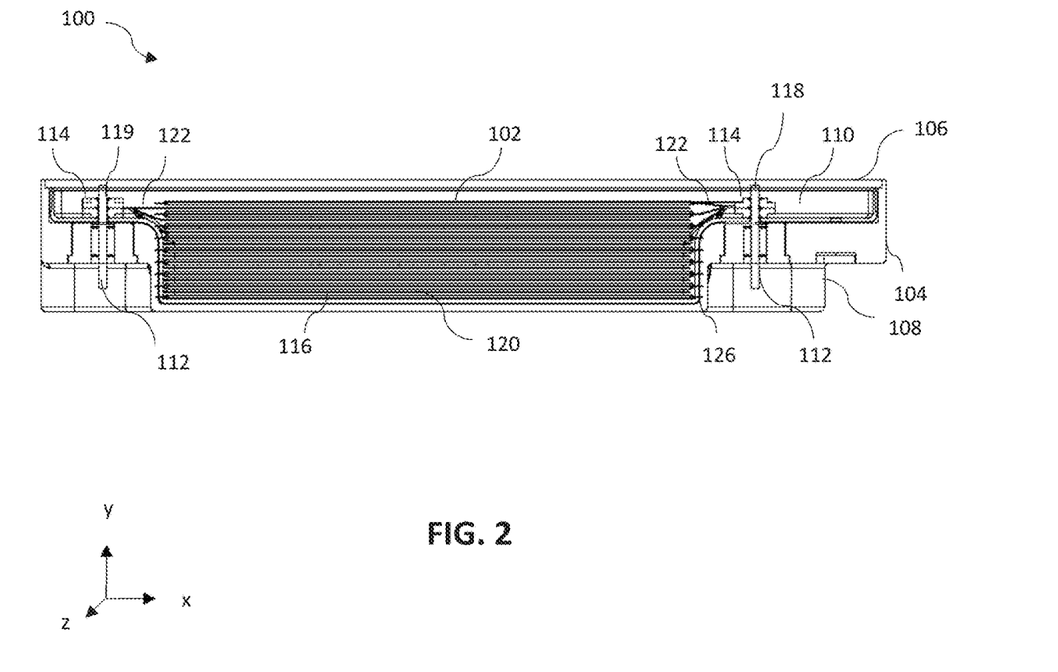
FIG. 2 is a cross-sectional view of an assembled battery in accordance with aspects of the present disclosure.
Figure 3:
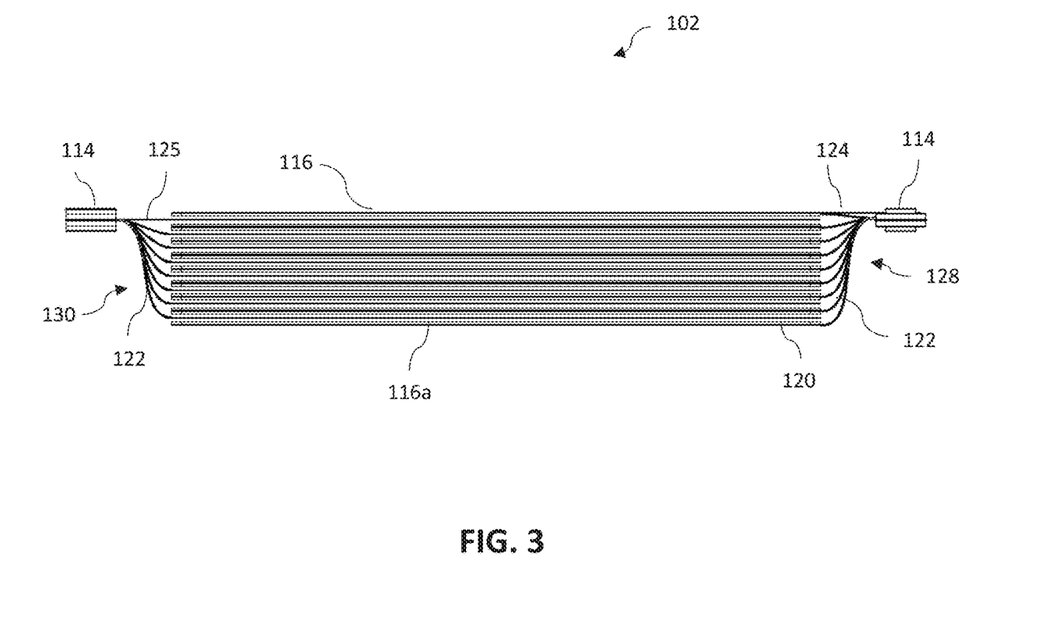
FIG. 3 is a side view of the example electrode assembly of the battery of FIGS. 1 and 2 in accordance with aspects of the present disclosure.

FIG. 3 is a side view of the electrode assembly 102 useful in the battery of FIGS. 1 and 2 in accordance with aspects of the present disclosure. In one example, each of the electrodes 116 can be generally planar and can be aligned and stacked, one atop another, to form a generally rectangularly shaped cross-section of the electrode assembly 102. The plurality of electrodes 116 can be assembled in a stack and banded together to maintain the electrodes 116 in the assembled stacked state to form the electrode assembly 102. Each electrode 116 in the electrode assembly 102 includes a tab portion 122 that is intended to be aligned in an identical location along x and y axes to form an anode tab stack 124 or a cathode tab stack 125. In one example, the electrode assembly 102 is assembled by stacking one electrode 116 atop another electrode 116 in an alternating fashion (i.e., alternating anode, cathode, anode, cathode, etc.) with the anode (i.e., positive) tab stack 124 aligned at an anode end 128 of the electrode assembly 102 and the cathode (i.e., negative) tab stack 125 aligned at a cathode end 130 of the electrode assembly 102 until the desired quantity of electrodes 116 are assembled together to form the electrode assembly 102.

Each electrode 116 has a plate portion 120 and the tab portion 122. The tab portion 122 can extend outward from the plate portion 120 of the electrode 116. The plate portion 120 and the tab portion 122 of the electrode 116 can be formed together as a single monolithic electrode body, or unit. Each electrode 116 includes an electrode material coated onto a metal foil layer. Each metal foil layer forms the tab portion 122, or tab, of the electrode 116 that is not coated with electrode material. Each of the tab portion 122 of the plurality of electrodes 116 can have an identical or nearly identical thickness and width. Similarly, each plate portion of the plurality of electrodes 116 can each have an identical or nearly identical thickness, width, and length. Once stacked and mechanically coupled together, the electrode assembly 102 can be electrically conductive.

Prior to assembly into the electrode assembly 102, each electrode 116 can be encased in a separator 126 (see, e.g., FIG. 2) with the tab portion 122 extending through and outside of the separator 126 to electrically connect together at the conductive coupler 114. The tab portion 122 (e.g., aluminum such as an aluminum foil) can have an active material provided thereon (e.g., $LiCoO_2$). The separator 126 can electrically insulate the adjacently disposed anode electrodes and cathode electrodes. The separator 126 is preferably formed of material that is wettable by cell electrolyte housed or contained within the battery case 104 and sufficiently porous to allow the electrolyte to flow through the material and maintain physical and chemical integrity within the electrode during operation. Examples of suitable materials forming the separator 126 include, but are not limited to, polyethylenetetrafluoroethylene, ceramics, non-woven glass, glass fiber material, polypropylene, and polyethylene.

During assembly, the electrodes 116 are stacked and aligned to form the electrode assembly 102. The tab portions 122 are gathered together along the anode and cathode ends 128, 130 of the electrode assembly 102. The tab portions 122 are flexible in order to be flexibly repositioned and configured to provide connection between the plate portion 120 of the electrode 116 and the conductive coupler 114 within a limited interior cavity 110 of the battery case 104. In gathering the tab portions 122 together, the tab portions 122 can be bent at an angle relative to the plate portion 120 in order to join the plurality of tab portions 122 together to form the anode 118 and the cathode 119, at the anode and cathode ends 128, 130, respectively. The degree, or angle, or bend corresponds to the position of each electrode 116 within the electrode assembly 102 stack relative to the position of the conductive coupler 114. The tab portions 122 are bent at an angle with respect to an x-z plane of the plate portions 120, with the tab portion 122 associated with the electrode 116 farthest from the gathering point of the conductive coupler 114 being bent the greatest degree, or angle. For example, a bottom electrode 116a can be farthest from the gathering point of the conductive collector 114 and thus the tab portion 122 of the bottom electrode 116a may have to extend the farthest to reach the conductive collector 114. In one example, the tab portions 122 can be bent tightly at a substantially right angle, with little to no bend radius, to be positioned to extend at an angle adjacently along the associated anode and cathode end 128, 130 of the electrode assembly 102. The bend angle and position of the tab portion 122 relative to the plate portion 120 can create a bend stress to the electrode 116.

The stacked (and aligned) electrodes 116 form an anode 118 and a cathode 119 of the electrode assembly 102. The anode 118 includes a set of electrodes 116 (e.g., anode electrode plates) having a set of tab portions 122 in the tab stack 124 that are conductively coupled via a conductive coupler 114 (i.e., an anode collector). Each of the plurality of electrodes 116 is generally planar and has a minimal plate thickness. Similarly, the cathode 119 includes a set of electrodes 116 (e.g., cathode electrode plates) having a set of tab portions 122 that are conductively coupled via another conductive coupler 114 (i.e., a cathode collector). The conductive couplers 114 can each be formed with a weld and/or a coupling member, for example.

Figure 4:
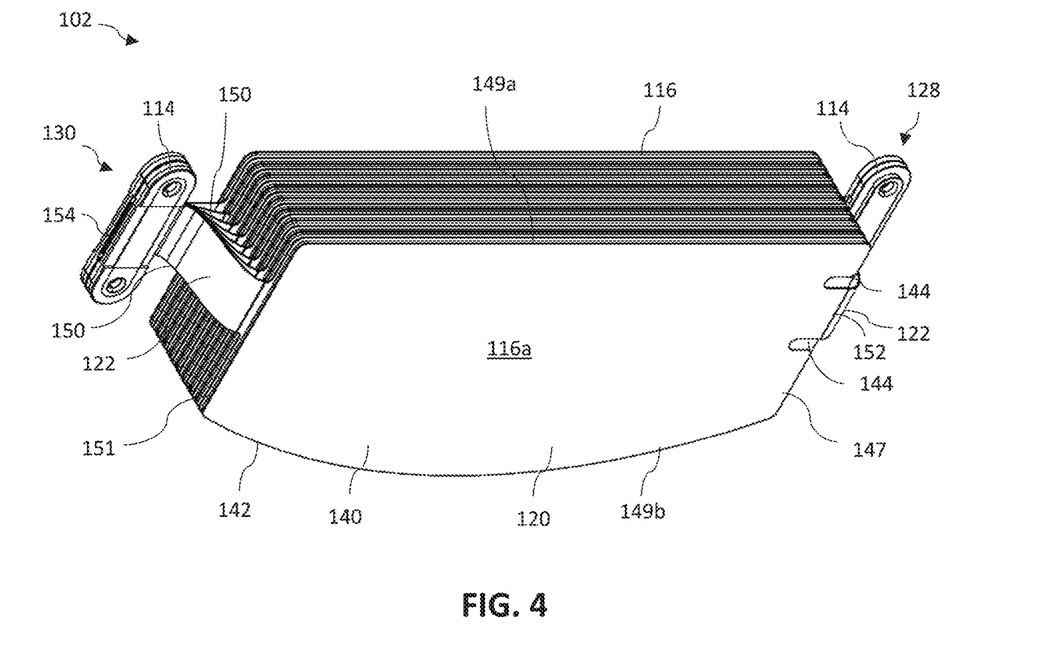
FIG. 4 is a perspective view of an example electrode assembly in accordance with aspects of the present disclosure.
Figure 5:
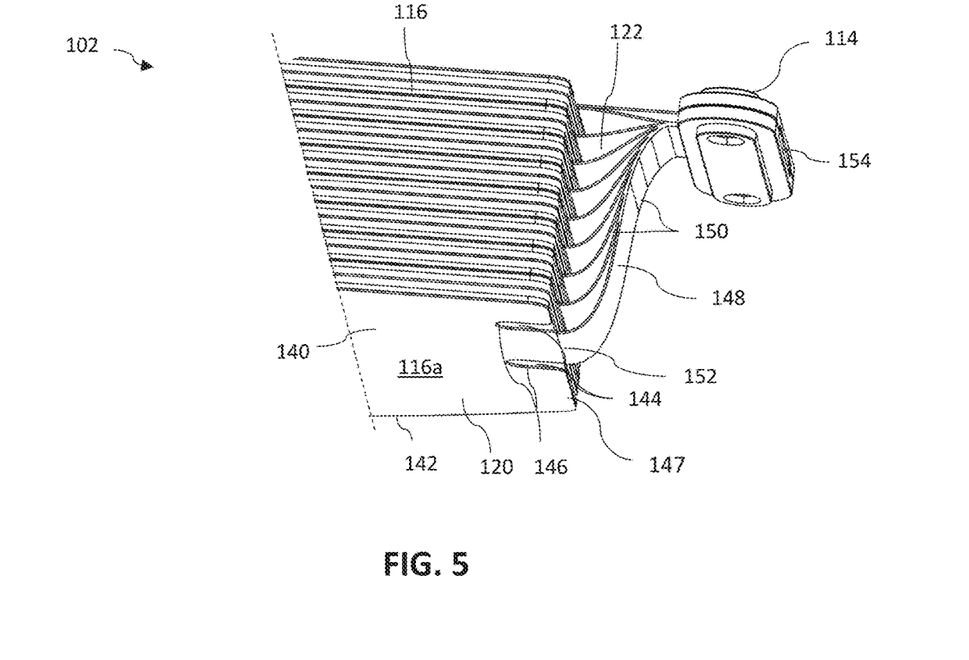
FIG. 5 is an expanded partial perspective view of the electrode assembly of FIG. 4 in accordance with aspects of the present disclosure.

FIGS. 4 and 5 illustrate perspective views of the electrode assembly 102. At least one electrode 116 of the electrode assembly 102 includes an inset area 144 in the plate portion. In one example, only a first electrode (e.g., the bottom electrode 116a) includes the inset area 144. For ease of illustrating, only the bottom electrode 116a is shown to include the inset area 144. In another example, the bottom of each of the anode and cathode electrodes 116, arranged with tab portions 122 extending from the electrode assembly 102 in opposite directions, (i.e., from opposing anode and cathode ends 128, 130 of the electrode assembly 102) include the inset area 144. In another example, each of the electrodes 116 in the electrode assembly 102 include the inset area 144. The inset area 144 can assist in distributing the bend stress of the tab portion 122 relative to the plate portion 120 along an area formed by the inset area 144. With the inset area 144, the tab gathering space, which includes the bend radius length along the tab portion 122 from the plate portion 120, can be approximately doubled. In one example, the tab gathering space was increased from 0.015" to 0.028".

With reference to the bottom electrode 116a as illustrative to one or more of the electrodes 116 of the electrode assembly 102, the tab portion 122 is adjoined to, and extends from, the plate portion 120 at a first end 147 of the plate portion 120. The tab portion 122 includes a tab body 148 and a tab body edge 150. The tab portion 122 includes a terminal end 154 opposite a connector end 152 and opposing sides 156a, 156b extending between the connector end 152 and the terminal end 154. The tab portion 122 is connected to the plate portion 120 at the tab connector end, or base, 152. The tab portion 122 can be formed, or cut, monolithically with the plate portion 120. Although, illustrated as rectangular, the tab portion 122 can be any suitable shape to facilitate connection between the electrodes 116 and the conductive coupler 114.

The plate portion 120 of the electrode 116 has opposing sides 149a, 149b, the first end 147, and an opposing second end 151. The plate portion 120 includes a plate body 140 having a perimeter body edge 142 can have linear or curved sides that forms a single width or a varied width (i.e., between opposing sides 149a, 149b) of the plate portion 120. The plate portion 120 can have a width (e.g., distance between opposing side edges 149a, 149b) that is greater than a width (e.g., distance between opposing sides 156a, 156b) of the tab portion 122 along or adjacent to the tab connector end 152. The plate portion 120 can include the inset area 144 recessed into the plate body 140 from the perimeter body edge 142 at the first end 147, adjacent the tab portion 122. The inset area 144 can be cut (e.g., laser cut) or otherwise formed within the plate portion 120 when the electrode 116 is formed or subsequently.

Figure 6A:
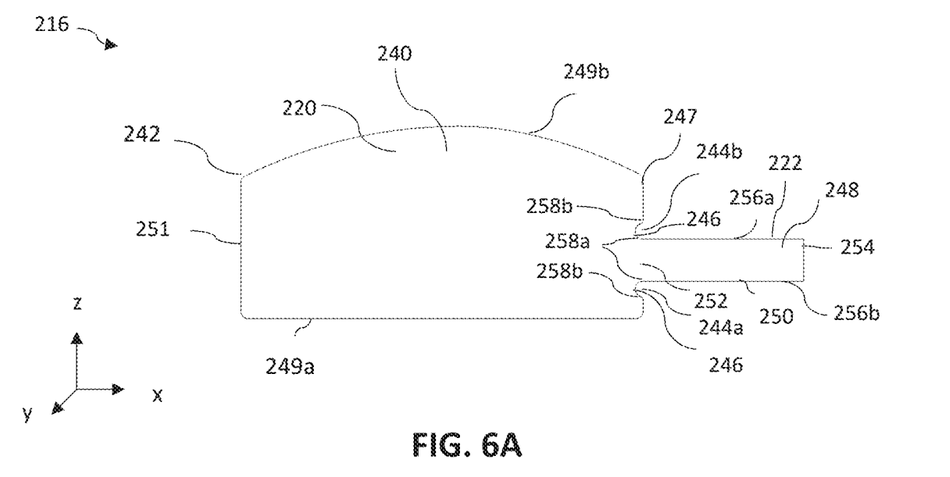
FIGS. 6A-6C are example electrodes in accordance with aspects of the present disclosure.
Figure 6B:
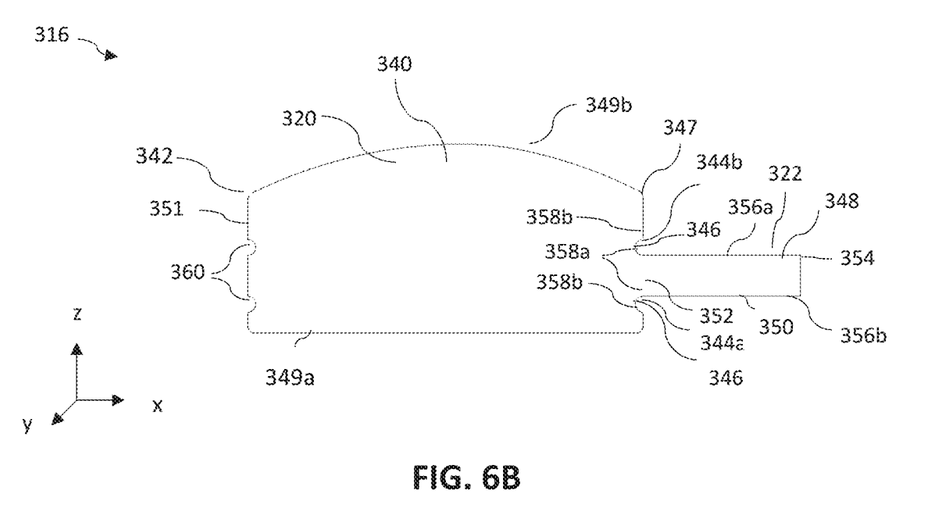
Figure 6C:
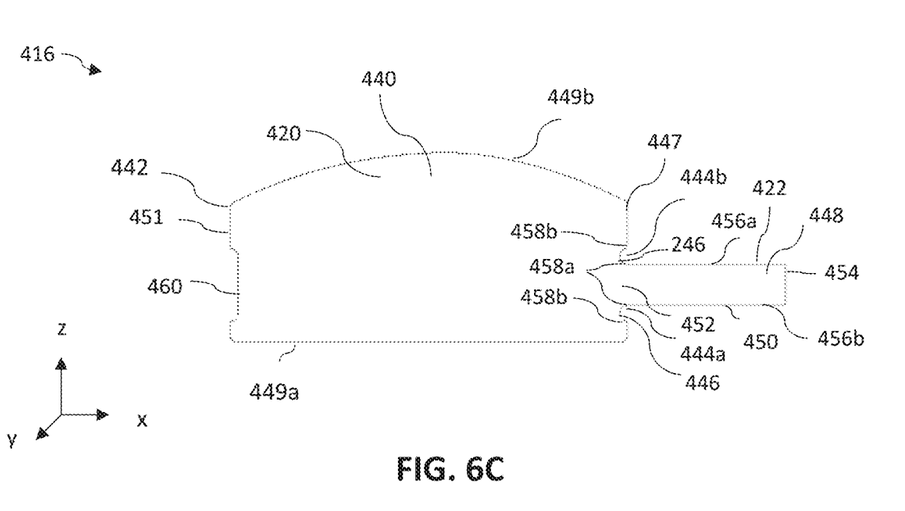

FIGS. 6A-6C illustrate example electrodes 216, 316, 416 useful in the electrode assembly 102 in accordance with aspects of the present disclosure. Electrodes 216, 316, 416 include elements akin to those of electrodes 116 described above, and therefore, not all of the components of the electrode 216, 316, 416 will be discussed in great detail and like elements are numbered similarly. Electrodes 216, 316, 416 are illustrative of a few useful examples, with many variations to the examples envisioned, in accordance with aspects of the present disclosure. Electrodes 216, 316, 416 include inset areas 244, 344, 444, respectively, as described further below.

As illustrated in FIG. 6A, the plate portion 220 of the electrode 216 can include the inset area 244. The inset area 244 can be included in the plate body 240 adjacent the tab portion 222 at the first end 247 of the plate portion 220, opposite the second end 251. The inset area 244 can be positioned along at least one of the opposing sides 256a, 256b of the tab portion 222 to extend from the side 256a, 256b of the tab portion 222 at the tab connector end 252. The tab connector end 252 is opposite the terminal end 254 of the tab portion 222. The inset area 244 can be disposed along the tab body edge 250 at one or both opposing sides 256 of the tab portion 222. For example, as illustrated in FIG. 6A, the inset area 244 includes a pair of insets 244a, 244b, with one of the pair of inset 244a, 244b disposed adjacent each of the opposing sides 256, respectively. The pair of insets 244a, 244b can be included when the tab portion 222 extends from the first end 247 of the plate portion 220 at a distance from both of the sides 249a, 249b of the plate portion 220. In another example, one of the opposing sides 256 of the tab portion 222 may be aligned colinearly with one of the sides 249a, 249b of the plate portion 220 and the inset area 244 consists of a single inset disposed along the first end 247 adjacent the opposite side 256 of the tab portion 222 to extend into the plate body 240.

The inset area 244 can be defined by an inset edge 246 that terminates at the perimeter body edge 242 at a first inset edge end 258a and terminates at the tab body edge 250 at a second inset edge end 258b. The inset area 244 can extend from the along the tab connector end 252 with the second inset edge end 258b aligned with the side edge 256 of the tab portion 222. In one example, the inset area 244 extends a distance into the plate body 240 in a x-axial direction from the side edge 256 of the tab portion 222. The inset area 244 also extends a distance in a z-axial direction from the side edge 256 of the tab portion 222 along the first end 247 of the plate portion 220 to provide a bend stress distribution radius for the tab portion 222 The inset area 244 can provide stress relief (e.g., minimize stress) at the juncture of the tab portion 222 and the plate portion 220 by providing additional flexibility and movement of the tab portion 222 in relation to the plate portion 220 and create an extended "tab gathering space" and provide strain relief to the tab portion 222 along the plate portion 220.

The inset area 244 can be a radiused concave area extending into the plate portion 220, as illustrated. In one example, the inset area 244 can be semi-circular. In other examples, the inset area 244 can be elliptical or otherwise include other non-linear edges. In other examples, the inset area 244 can be defined by linear edges or line segments (e.g., rectangular, square, triangular, etc.) or can be defined by both curved and linear edges (e.g., opposing linear side edges and curved end edge).

The electrodes 316, 416 illustrated in FIGS. 6B and 6C also include inset areas 344, 444 similar to the inset area 244 described above with respect to FIG. 6A. The electrodes 316, 416 include some similar components and similar features as the electrodes 116 and 216 and therefore, not all of the components of the electrode 316, 416 will be discussed in great detail and like elements are numbered similarly. As illustrated in FIGS. 6B and 6C, the electrodes 316, 416 can also include a recessed area 360, 460 within the plate portion 320, 420 along the second end 351, 451. The recessed area 360, 460, or second inset area, can be disposed on the second end 351, 451 of the plate portion 320, 420 directly aligned across the plate portion 320, 420 from a tab portion 322, 422 along the x-axis. The recessed area 360, 460 extends into the plate portion 320, 420 and connects, or terminates at, the perimeter body edge 342, 442. The recessed area 360, 460 is open along the perimeter body edge 342. The recessed area 360, 460 is configured to provide additional bend space for the tab portion 322, 422 of an adjacently disposed electrode 216, 316, 416 when assembled into the electrode assembly, such as electrode assembly 102. When assembled into the electrode assembly 102, the recessed area 360, 460 is aligned with the tab portion 322, 422 of the oppositely charged electrode disposed adjacent (e.g., above or below) the electrode 316, 416 including the recessed area 360, 460. The space formed into the plate body 340, 440 by the recessed area 460 provides space for the tab portion 322, 440 of oppositely charged electrodes 116 to extend within. The recessed area 360, 460 can provide additional flexibility, or tab bend gathering space to the tab portion 222, 322, 422 of the electrode 216, 316, 416 disposed above or below the recessed area 360, 460 having the tab portion 322, 422 extending in the direction of the recessed area 360, 460. Although, not shown, in one example, the recessed area 360,460 can be included on the plate portion 320, 420 that does not include an inset area.

In one example, such as illustrated in FIG. 6B, the recessed area 360 can be the same or similar size and shape as the inset area 344. The recessed area 360 at the second end 351 can include a pair of recesses 360a, 360b aligned along the x-axis with the insets 344a, 344b at the first end 347 of the plate portion 320. The recesses 360a, 360b can be sized and shaped similar to the insets 244a, 224b.

In another example, as illustrated in FIG. 6C, the recessed area 460 can be a longitudinal slotted shape that extends along the second end 451 (i.e., in the z-axial direction) a distance equivalent or greater than the width of the tab portion 422 at the tab connector end 452. In another example, the recessed area 460 extends along the second end 451 equivalent to a distance between the opposing insets 444a, 444b. In another example, the recessed area 460 extends a distance along the second end 451 (i.e., in the z-axial direction) substantially equivalent to a width of the tab portion 422 along the tab connector end 452. In one example, the recessed area 460 can extend a distance from the perimeter body edge 442 into the plate portion 420 in the x-axial direction equivalent or substantially equivalent to the inset area 444 at the first end 428.

In accordance with aspects of the present disclosure, the inset areas 244, 344, 444 and recessed areas 360, 460 each subtracts from, or decrease, the overall area of the plate portion 220, 320, 420. The reduced area of the plate portion 220, 320, 420 resulting from the inset area 244, 344, 444 and/or the recessed area 360, 460 can be sized to minimally reduce the area of the plate portion 220, 320, 420. The energy producing capacity of the electrode 116, 216, 316, 416 corresponds to the surface area of the plate portion 120, 220, 320, 420. The area occupied by the inset area 244, 344, 444 and the recessed area 360, 460 forms a negative area within the plate portion 220, 320, 420 that reduces the energy forming capacity of the electrode 216, 31, 416, with the reduction of energy capacity corresponding to the size of the inset area 244, 344, 444 and/or the recessed area 360, 460 included. The inset area 244, 344, 444 and/or the recessed area 360, 460 comprise a suitable area to minimally impact the energy capacity while providing bend stress relief to the electrode along the juncture of the tab portion and the plate portion in order that maximum potential energy capacity of the electrode assembly 102, and the battery 100, is realized.

It should be understood that various aspects disclosed herein may be combined in different combinations than the combinations specifically presented in the description and accompanying drawings. Although the present disclosure has been described with reference to preferred embodiments, workers skilled in the art will recognize that changes can be made in form and detail without departing from the spirit and scope of the present disclosure.

What is claimed is:

1. An electrode for an electrochemical cell comprising:
a plate portion comprising a plate body, a perimeter body edge, and an inset area recessed into the plate body from the perimeter body edge; and
a tab portion extending from a first end of the plate portion, the tab portion comprising a tab body and tab body edges on opposing sides of the tab body, wherein the inset area includes a pair of insets disposed adjacent opposing sides of the tab portion end and wherein each inset of the pair of insets is defined by an inset edge that extends between the perimeter body edge and the tab body edge of a respective side of the tab portion,
wherein the plate portion includes a recessed area at a second end of the plate portion opposite the inset area at the first end, and wherein the recessed area comprises a pair of recesses longitudinally aligned with the pair of insets.

2. The electrode of claim 1, wherein the inset area is semi-circular.

3. The electrode of claim 1, wherein the recessed area comprises two semi-circular recesses.

4. The electrode of claim 1, wherein the recessed area extends a width of the plate portion at the second end substantially equivalent to a combined width of the inset area and tab at the first end.

5. An electrode assembly for a battery comprising:
a plurality of electrodes arranged one atop another in a stack, wherein each of the plurality of electrodes includes a plate portion and a tab portion extending from the plate portion, wherein the tab portions of the plurality of electrodes are aligned, wherein at least a bottom electrode of the plurality of electrodes includes an inset area extending from adjacent a tab connecting end of the tab portion and recessed into a body of the plate portion extending alongside the tab portion,
wherein the inset area includes a pair of insets disposed adjacent opposing sides of the tab connection end,
wherein at least one of the plurality of electrodes includes a recessed area on a second end aligned with the inset area on a first end of the electrode,
wherein the recessed area comprises a pair of recesses longitudinally aligned with the pair of insets.

6. The electrode assembly of claim 5, a plurality of electrodes including anode and cathode electrodes, wherein the anode electrode plates and the cathode electrode plates are stacked in an alternating anode-cathode pattern, and wherein the tab portion of each of the anode electrode plates are aligned at an anode end of the stack and the tab portion of each of the cathode electrode plates are aligned at a cathode end of the stack opposite the anode end, and wherein at least each of a bottom anode electrode and a bottom cathode electrode includes a respective inset area.

7. The electrode assembly of claim 5, wherein each of the plurality of electrodes includes an inset area.

8. The electrode assembly of claim 5, wherein the inset area and the recessed area is included in each of the plurality of electrodes.

9. The electrode assembly of claim 5, wherein the tab portion of the bottom electrode is oriented substantially perpendicular to the plate portion at the tab connecting end, wherein the inset area forms a bend stress distribution radius along the tab connecting end.

10. A rechargeable lithium-ion battery comprising:
an electrode assembly comprising:
a plurality of electrodes assembled in a stack, wherein each of the plurality of electrodes includes a plate portion and a tab portion extending from the plate portion, wherein at least a bottom electrode of the plurality of electrodes includes an inset area, wherein the insert inset area extends from the tab portion and is recessed into a body of the plate portion alongside each side of the tab portion, wherein the inset area includes a pair of insets disposed adjacent opposing sides of the tab portion,
wherein at least one of the plurality of electrodes includes a recessed area on a second end aligned with the inset area on a first end of the electrode,
wherein the recessed area comprises a pair of recesses longitudinally aligned with the pair of insets;
a conductive coupler to electrically connect the tab portions of the plurality of electrodes; and
a battery case to house the electrode assembly and the conductive coupler.

11. The battery of claim 10, wherein the plurality of electrodes are stacked in an alternating anode-cathode pattern, and wherein the tab portion of each of the anode electrode plates are aligned at an anode end of the stack and the tab portion of each of the cathode electrode plates are aligned at a cathode end of the stack opposite the anode end, and wherein at least each of a bottom anode electrode and a bottom cathode electrode includes a respective inset area.

12. The battery of claim 10, wherein the tab portion of the bottom electrode extends substantially perpendicular to the plate portion along a tab connecting end to extend to the conductive coupler, and wherein the tab connecting end is radiused adjacent the inset area.

13. The battery of claim 10, wherein each of the plurality of electrodes includes an inset area.

14. The battery of claim 10, wherein each of the plurality of electrodes includes a recessed area aligned with a tab portion of an adjacent electrode.

* * * * *